June 10, 1947.  A. H. NEULAND  2,421,846
FLUID PRESSURE ENGINE
Filed Sept. 27, 1943  2 Sheets-Sheet 1

INVENTOR
Alfred H. Neuland

June 10, 1947.　　　A. H. NEULAND　　　2,421,846
FLUID PRESSURE ENGINE
Filed Sept. 27, 1943　　　2 Sheets-Sheet 2
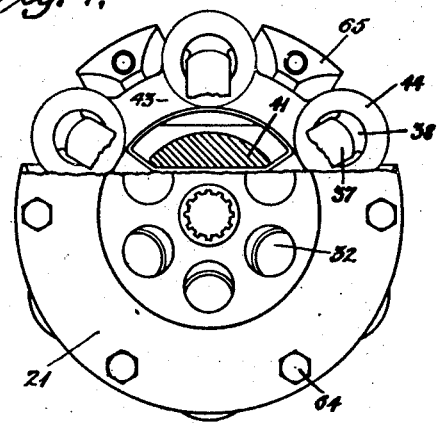
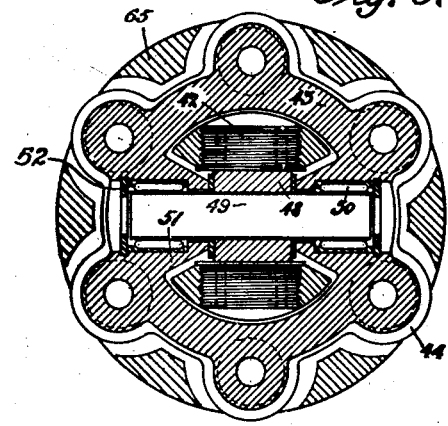
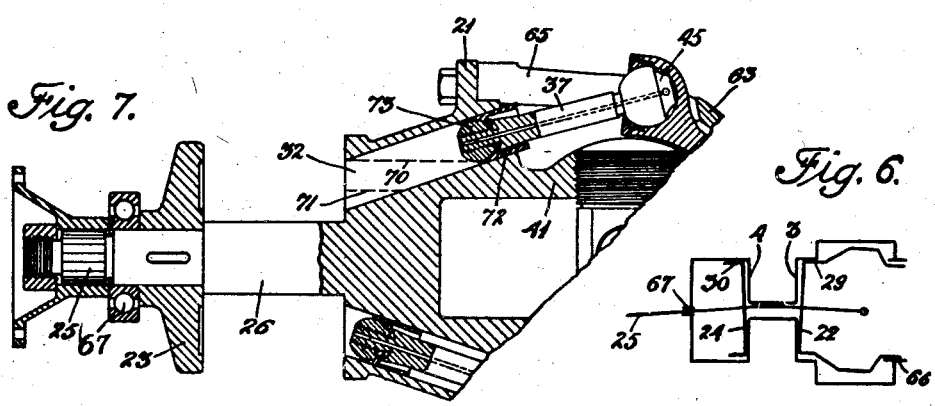
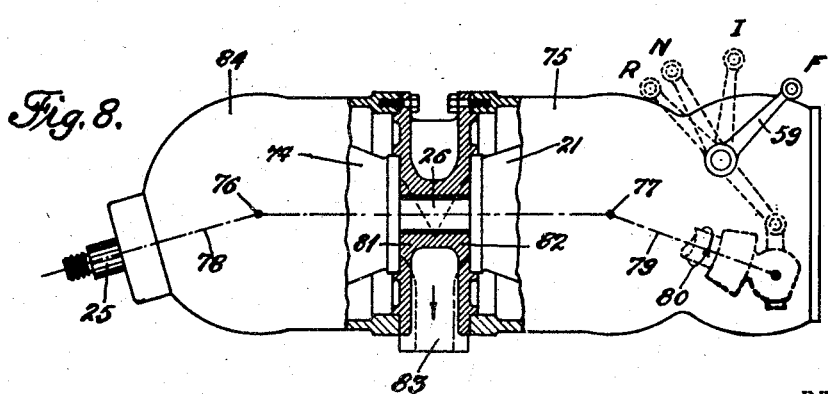
INVENTOR
Alfred H. Neuland Patented June 10, 1947

2,421,846

UNITED STATES PATENT OFFICE 2,421,846

FLUID PRESSURE ENGINE

Alfons H. Neuland, Jersey City, N. J.

Application September 27, 1943, Serial No. 504,030

21 Claims. (Cl. 103—162)

This invention relates to expansible chamber fluid pressure engines such as hydraulic pumps and motors and more particularly to, so called, rotary engines having rotatable fluid chambers in which the displacement or stroke can be varied.

The general object of the invention is to provide an efficient device of light weight capable of operating with high fluid pressure and at high speed which lends itself to rapid production at relatively low cost and is suited for use in many fields of application such as control or transmission systems in machine tools, vehicles, airplanes and ships.

More particularly the objects of the invention are to provide effective balancing of forces in the device, to substantially reduce friction and fluid leakage, to provide a smooth and efficient flow of fluid into and out of the device, to reduce the formation of vacuum pockets and eddy currents, and to provide a construction and arrangement, transforming reciprocating motion into rotary motion and varying the stroke of the displacement members or pistons, that is strong and is easy to assemble.

My invention resides in novel features of construction and in the arrangement and combination of its component parts. The foregoing and other objects and advantages will appear in the following description of a preferred embodiment and from the drawings, and my invention will hereafter be more fully defined in the appended claims.

Fig. 4 is a left end view of the cylinder element, viewed on the line C—C in Fig. 1, partly cut away to show the tension yoke, piston actuating element and fragments of displacement members or pistons extending from its sockets and the rotor supporting arms arranged between the ball and socket joints.

Fig. 5 is a transverse section taken in the line D—D in Fig. 1, with the piston actuating element and control shaft in a central position, showing construction of the universal thrust joint connecting the rotor with the piston actuating element.

Fig. 6 is a diagram showing the manner in which the converging oil films between valve and rotor faces are formed.

Fig. 7 is a fragment, partly in section of a modified form of cylinder element and rotor embodying my invention.

Fig. 8 is a modified form of variable displacement fluid pump or motor, partly in section, embodying my invention, in which a pair of substantially identical units are joined to provide balanced pressure thrust.

In the following description my device will be referred to as a pump, although it will be understood that it is capable of operating as a motor when supplied with fluid under pressure.

Figure 1:
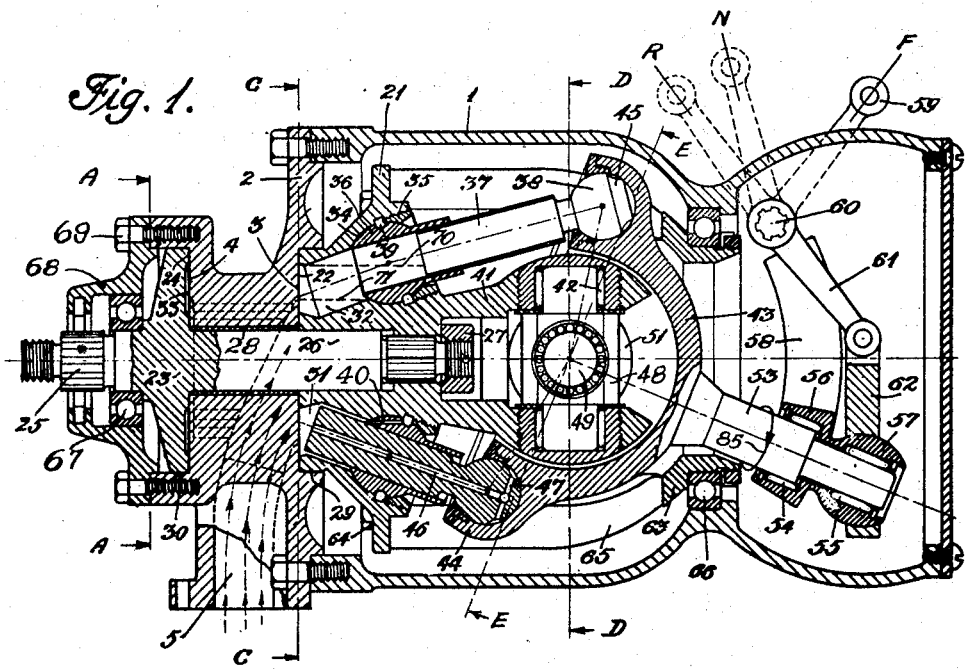
Fig. 1 is a vertical section of a fluid pump or motor embodying my invention.
Figure 2:
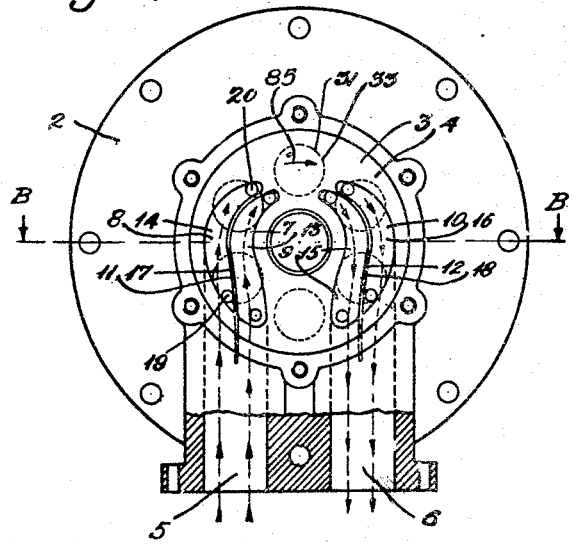
Fig. 2 is an end view of the valve body, partly in section of the device shown in Fig. 1, viewed from the left on the line A—A, showing the fluid ducts, the ports in the valve face and the baffle partitions within the ports.
Figure 3:
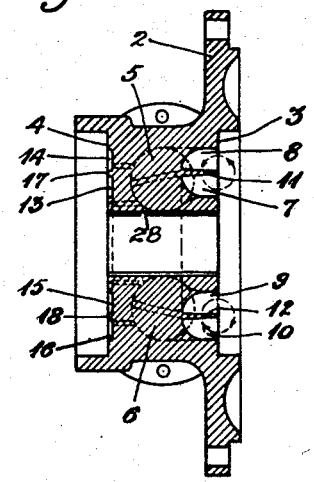
Fig. 3 is a horizontal cross section of the valve body in Fig. 2 taken on the line B—B, showing the fluid ducts and ports, the valve face at the right and the fluid pressure balancing face at the left.

The pump shown in Figures 1 to 6 consists of a housing or frame including an outer casing 1, and a valve body 2, preferably formed separate from the casing and bolted thereto as shown. The valve body 2 is provided with spaced but axially aligned fluid pressure balancing or valve faces 3 and 4 arranged about the rotational axis of the pump, and with radially extending inlet and outlet fluid ducts 5 and 6, respectively, arranged between the faces 3 and 4, the inlet duct 5 being shaped to open into and circumferentially converge with the valve face 3, on one side thereof forming circumferentially extending radially inner and outer fluid inlet ports 7 and 8, respectively, and the outlet duct 6 being arranged substantially adjacent to the inlet duct, as shown in Fig. 2, and shaped to open into and converge circumferentially with the valve face on the other side, forming circumferentially extending radially inner and outer fluid outlet ports 9 and 10, respectively. I provide a baffle partition 11, separating the inlet ports 7 and 8, and preferably also a baffle partition 12, separating the outlet ports 9 and 10, the ends of the ports being preferably curved radially inward and shaped so that the radially inner ports extend circumferentially beyond the radially outer ports as shown in the upper part of Fig. 2. The pressure balancing face 4 is also provided with ports or valve cavities 13, 14, 15 and 16, preferably of identical face area and shape as the ports 7, 8, 9 and 10, respectively, and preferably also provided with partitions 17 and 18, so that the port 13, in face 4, for instance, also represents the port 7 in face 3, as shown in Fig. 2 and ports 13, 15, 14, 16 and baffle partitions 17, 18 in the valve face 4 also represent the ports 7, 9, 8, 10 and the baffle partitions 11, 12 in the valve face 3 respectively; the ports or cavities in face 4 on one side of the valve body being arranged to communicate with corresponding ports in face 3 on the other side of the valve body, in this instance, by ducts such as the ducts 19, 20 at opposite ends of each of the ports. The purpose of the baffle partition and arrangement and shaping of the ducts and ports will hereafter be more fully described.

I provide a rotor unit comprising a cylinder portion or element 21 having a cylinder face 22 arranged adjacent the valve face 3, fluid pressure in one of the ports exerting a direct axial thrust thereon. I further provide means for counteracting such axial thrust and transferring it to the housing, said means in the present embodiment consists of a rotable thrust or rotor element 23 having a face 24 arranged adjacent to the valve face 4. The thrust element 23 is preferably shaped to form an integral power shaft providing a power connection 25 and a tension shaft 26 extending through the valve body and provided with a splined portion and a locknut 27 drivingly connecting the cylinder element with the thrust element to operate as a unit and so as to provide a fixed spacing therebetween. The tension shaft 26 may also serve as a journal and in cooperation with a bearing such as the sleeve bearing 28 in the valve body provide rotational support for the rotor; however, I preferably provide the cylinder and thrust elements 21 and 23 with cylindrical or arcuate journal surfaces 29 and 30, respectively, at their outer periphery closely fitted within bearing surfaces in the valve body providing cylindrical fluid seals adjoining and continuing the working clearances formed by the faces 3, 22 and 4, 24, as shown in Fig. 1, for reasons which will hereafter be set forth. As heretofore mentioned, the face area of the ports on one side is identical with the face area of the ports on the other side of the valve body and since axially opposite ports are interconnected, thrust on the cylinder element 21, due to fluid pressure in one of the ports in one direction is counteracted and substantially balanced by thrust on the thrust element 23 due to fluid pressure in a corresponding port in the opposite direction. Furthermore, the balanced thrust, acting on only one side of the tension shaft tends to bias the cylinder element slightly and to spread the rotor faces apart on the pressure side and to bring them a little closer to the valve faces on the opposite circumferential side, the tension shaft preventing an increase in the average spacing between cylinder and thrust elements but flexing sufficiently so as to slightly bias the thrust and cylinder elements, thus establishing a slight circumferential difference in the working clearance between adjoining faces. This construction and arrangement permits the use of a very small working clearance between rotor and valve faces, which is substantially not affected by changes in temperature, resulting in greatly reduced leakage of fluid even during operation with very high fluid pressures. Fluid under pressure forced into the small working clearances having a circumferential difference, however slight, establishes a circumferentially converging fluid film which prevents metal to metal contact between faces and thus greatly reduces friction therebetween, particularly in instances where oil is used to serve as the hydraulic fluid. It will be understood that the working clearance between the valve body bearing surfaces and the journal surfaces 26, 29 and 30 is proportioned to permit flexing of the shaft 26 as above described. The formation of the oil film will best be understood by reference to the diagram in Fig. 6, in which the deflection of the tension shaft 26 and the tilting of the rotor faces due to fluid pressure in the upper portion has been greatly exaggerated to show how the working clearance between adjoining faces on the high pressure side of the tension shaft increases and on the other, or low pressure, side decreases. It will be seen from the figure that the tension shaft 26 flexes radially toward the high pressure side, bringing the journals 29 and 30 closer to their respective bearing surfaces in the valve body, thereby decreasing the radial working clearance therebetween. The arrangement of the cylindrical fluid seal adjacent to and as a continuation of the working clearance formed by adjoining faces substantially reduces circumferential fluid leakage between the high pressure and low pressure ports. From the lower portion of Fig. 6, it will be seen that tilting of the rotor faces due to flexing of the tension shaft 26, brings their portions on the low pressure side closer to the valve faces and thereby maintains substantially the same lateral working clearance on both sides of the valve body and so prevents formation of an axial thrust on one side substantially greater than the thrust on the other side of the valve body. When fluid pressure in the ducts 5 and 6 reverses, the tension shaft 26 flexes in the opposite direction, establishing the identical conditions of operation heretofore described.

The cylinder element 21, along the face 22, is provided with cavities 31, disposed about its rotational axis, which communicate with or are continued to form longitudinally extending preferably round sectioned fluid chambers 32. I preferably also provide the thrust element, along its face 24, with cavities 33 having substantially the same face area and circumferential spacing as the cavities 31, the cavities 31 in one rotor face being positioned with respect to the cavities 33 in the other rotor face so that rotation of the rotor and the cavities 31 and 33 in the direction of the arrow, as shown in Fig. 2, causes them to move out of registry with the ports 7 and 13, respectively, substantially at the same instant and thereafter to move simultaneously into registry with the ports 9 and 15. Rotation of the fluid chambers 32 and their openings or cavities 31 into and out of registry with the ports, causes the thrust between valve and rotor faces 3 and 22 to vary. This is clearly seen by reference to Fig. 2, in which the six dotted circles 31 represent the cavities or fluid chamber openings in rotor face 22, as well as the cavities 33 in rotor face 24. If, in the figure, fluid in duct 6 is assumed to be under pressure and the cavities are in the position shown, the face area of only two of the cavities is subjected to fluid pressure, however a slight rotation of the rotor, for instance, in a clockwise direction brings the cavity at the top also into registry with the port 9 and consequently the face area of three cavities is now subjected to fluid pressure in duct 6. As a result, the thrust between faces 3 and 22 varies as the rotor rotates and tends to set up vibrations particularly when the fluid pressure is high. My construction and arrangement overcomes this objection by provision of the cavities in the thrust element 23, which in cooperation with other elements of the device hereinafter to be described, counteracts and substantially balances such variations by establishing a counterthrust between the faces 4 and 24 which varies simultaneously and to the same extent as the thrust between faces 3 and 22.

The cylindrical fluid chambers 32 extending longitudinally in the cylinder element 21 are arranged in an inclined position and so that they diverge outwardly from the cylinder face 22. In the outer portion of each cavity or chamber, I provide a ball socket, formed partly by the spherical surface 34 and partly by the gland 35, which is secured to the cylinder element by suitable means such as the screw thread shown. I provide a piston receiving body 36 having a ball portion forming with the socket a ball and socket joint and having a smooth hole, preferably of cylindrical shape, extending therethrough and preferably also having an outwardly extending sleeve portion, and within the piston receiving body provide a reciprocable displacement member or piston having a straight piston portion 37 closely fitted within the smooth hole of the piston receiving body and a ball portion 38 at its outer end. It is seen that the bore in the piston receiving body provides a continuation of the fluid chamber 32, the ball and socket joint permitting articulation between the piston receiving body and the cylinder element. The bulk of the thrust due to fluid pressure in the chamber 32 is exerted against the piston 37. However the bore of the chamber 32 is somewhat larger than that in the piston receiving body 36, to permit the piston to weave slightly therein, exposing a small arcuate surface on the ball of the piston receiving body, next to the piston, to fluid pressure which exerts a minor thrust thereon. I provide means for counteracting and substantially balancing such minor thrust comprising one or more pressure pockets, arranged within the ball and socket joint beyond the spherical surface 34, receiving fluid under pressure from the fluid chamber 32. The pocket in the joint may conveniently be formed by provision of an annular groove 39 in the socket or ball or in both, the socket and the ball portions of the joint receiving fluid under pressure from the fluid chamber 32 through the slight working clearance between the ball and spherical surface 34 or preferably through the fluid hole 40 in the piston receiving body, the pocket 39 being positioned, and its area being proportioned, so that fluid under pressure therein counteracts and substantially balances the minor outward thrust on the piston receiving body, substantially reducing friction in the ball and socket joint and permitting the use of a high fluid pressure.

The rotor also includes a pair of pillars 41 formed preferably integral with the cylinder element 21, arranged to extend longitudinally beyond and partly within the circle of the fluid chambers and pistons and spaced one from the other to form a central tension yoke. The pillars expand radially outward, preferably have arcuate shaped outer surfaces and provide through holes or cavities near their ends, also of substantial diameter, within which a pair of anti-friction bearings, in this instance needle roller bearings 42, are housed aligned on an axis perpendicular to the rotational axis of the rotor and suitably secured to the pillars as by screw threads shown in the drawing.

The rotor also includes an element 43, operatively associated with the cylinder element in articular relation therewith, which will hereafter be referred to as the piston actuating element and which with the tension yoke herein above mentioned and in cooperation with other elements hereafter to be described forms a powerful universal thrust joint for the transfer of thrust between the piston actuating and cylinder elements and provides a driving connection therebetween. Fluid pressure on said displacement members is thus made to exert an indirect separative thrust between cylinder element and valve body. The piston actuating element is shaped substantially in the form of a cup fitted over the spherical portion of the tension yoke and along its outer periphery is provided with outwardly extending bosses 44 housing sockets which, with the ball ends 38 on the pistons, form ball and socket joints connecting the pistons with the piston actuating element. I provide the pistons, near the end of their ball portion 38, with one or more thrust balancing cavities, which may conveniently take the form of a circular groove 45 communicating with and receiving fluid under pressure from the fluid chamber 32 through the ducts 46 and 47. As shown in the drawing the diameter of the ball 38 is considerably larger than that of the piston 37, the groove 45 being proportioned and positioned so that fluid pressure therein exerts a counterthrust on the piston and substantially balances the outward thrust exerted upon the piston by fluid under pressure in the fluid chamber 32. With this construction the bearing surfaces of the ball and socket joint are not called upon to carry substantial loads but serve largely as articulatable fluid seals and permit the fluid under pressure in the fluid chambers 32 to be connected to and to exert a direct thrust on the exposed surface in the sockets of the piston actuating element provided by the groove 45. The ball 38, in its plane of articulation, is guided by three substantially evenly spaced contact areas, at the top, bottom and end, which prevents the ball from jamming within its socket and insures free articulation even during operation under conditions of high fluid pressures. Friction in the joint is thus substantially reduced.

As heretofore mentioned I provide a universal thrust joint for transferring thrust, exerted by the pistons on the piston actuating element indirectly, to the rotor. The thrust joint includes a pivotable yoke shaft 48 having an expanded central portion of substantial diameter adapted to be inserted into the tension yoke through the threaded through hole in pillars 41, and having end portions of smaller diameter providing journal surfaces for pivotally supporting it by the roller bearings 42. A crosspin 49 is snugly fitted within the centrally positioned bore in the expanded portion of yoke shaft 48 supporting the crosspin on an axis perpendicular to the pivot axis of the shaft, the protruding portions of the crosspin being provided with journal surfaces pivotally engaging the needle roller bearings 50 housed within bores or crosspin cavities in the bosses 51, which extend inwardly from the piston actuating element 43 as particularly shown in Figs. 1 and 5. The thrust joint is assembled by first inserting the yoke shaft through one of the through holes in pillars 41 and screwing the roller bearings in place, as clearly shown in Fig. 1, slipping the piston actuating element over the spherical portion of the pillars 41, inserting the crosspin 49 through one of the bores in the piston actuating element and into the bore of yoke shaft 48 and thereupon pushing the roller bearings 50 in place between the end portions of the crosspin and the piston actuating element, the crosspin and bearings being held in position by suitable means, such as the lockrings 52. The universal thrust joint thus formed is very rigid and strong, is easy to assemble, and provides large roller bearing surfaces capable of transferring a powerful axial thrust as well as rotational torque between piston actuating element and rotor with but little friction. This permits the use of a high working fluid pressure without subjecting the joint to objectionable wear.

The piston actuating element 43 is provided with means for rotatively supporting it on an axis angularly displaced with respect to the rotational axis of the rotor and with means for biasing or varying the angular displacement of its rotational axis. In the present embodiment the piston actuating element is provided with a central, outwardly extending fulcrum shaft 53 formed preferably integral with the piston actuating element and provided at its end with a fulcrum roller body providing a pair of roller bearings 54 and 55 and comprising a portion forming a taper roller 56 and including a ball portion 57. The roller 56 is arranged between a pair of arcuate grooves 58 formed in the side walls of the casing I, which serve to hold the shaft 53 in the fulcrum plane while the outer lever, 59, pivotally supported in the casing by the rock shaft 60 and linked to the ball 57 by the inner lever 61, and connecting rod 62, serves to bias the fulcrum shaft 53 into various angular positions.

I further provide an outboard bearing for the rotor comprising an outer support extending axially beyond the fluid chambers from an outer portion of the cylinder element and an annulus 63 arranged adjacent to the outer side of piston actuating element 43 and fixedly secured to the outer periphery of cylinder element 21 by bolts 64. The outer support is preferably shaped to form arms 65, formed integral with the annulus 63 and arranged between the bosses 44 on the piston actuating element 43 so as to provide a clearance therebetween, a ball bearing 66 interposed between the housing and annulus serving to provide rigid rotational support for the rotor. The annulus is formed to provide a substantial central opening within which is arranged the means for rotatively supporting the piston actuating element by the housing in various positions, permitting angular displacement of its rotational axis within wide limits. The thrust element 23 is also supported on its outer side by a ball bearing 67 housed within the cover plate 68, which is secured to the housing or valve body 2 by bolts 69.

As heretofore described the face area, including that of the cavities 33, of thrust element 23 exposed to fluid pressure is substantially the same as the face area, including the cavities 31 in cylinder element 21. The cavities 31 communicate with the fluid chambers 32 so that the thrust on their area is exerted not directly upon the rotor, as on the area of cavities 33, but on the pistons 37 or through the pistons or displacement members on the piston actuating element 43. However, the thrust upon the piston actuating element is transferred to the yoke pillars 41 and rotor by means of the universal thrust joint as heretofore set forth. The sum of the thrusts exerted on cylinder element 21 by fluid pressure in one direction, one component directly on the cylinder face 22 and another component indirectly through the thrust joint, is equal to the thrust exerted upon the thrust element 23 in the opposite direction. In this connection it will be seen that the rigid support of the rotor near its ends by the bearing 67 and particularly by the outboard bearing 66, which transfers radial thrust from the tension yoke 41 to the housing I, prevents distortion of the working clearance between rotor and valve faces and cooperates with the tension shaft 26 in forming the converging oil films between faces and the oil seal along their outer periphery during operation with high fluid pressures, in a manner heretofore already described.

When the device shown in Fig. 1 is operated as an oil pump, for instance, so as to drive the elements 21 and 43 in the direction of the arrow 85 through the power connection 25, with the fulcrum shaft 53 held in position of maximum displacement by the lever 59 when in position F, as shown in the figure, oil, from a source not shown, flowing through duct 5, converges with one side of the cylinder face 22 at a sharp angle in the direction of the fluid chambers moving past port 8. The inlet and outlet ducts 5 and 6 and the degree of circumferential convergence with the valve face are proportioned so that the velocity of the fluid in the ducts is substantially the same as the velocity of the fluid chambers moving past radially central portions of the ports, providing a smooth flow of fluid into and out of the device and its fluid chambers. This feature of my device is broadly claimed in my Patent No. 2,290,764, bearing date of July 21, 1942. In accordance with the present invention, I provide baffle partitions 11 and 12 in the converging portion of the ducts and ports 8 and 10 which substantially counteract formation of eddy currents that ordinarily tend to form in the ports, during rotation, due to centrifugal force acting on fluid in the cylinders near the valve face, as shown by the arcuate arrows in Fig. 3, and which also permit fluid along the radially inner and outer ports to flow at different velocities, the fluid velocity in the radially inner port 7 being substantially that of the cylinders moving past a radially central portion of such inner port and the fluid velocity along the radially outer port 8 being substantially that of the fluid chambers moving past a radially central portion of such radially outer port. While I have here shown a single baffle partition in each port, it will be understood that several such partitions may be used to secure even greater suppression of eddy currents, particularly in large units operating at high speed. As mentioned, the fluid chamber openings, shown by the dotted circles 31 in Fig. 2, move out of registry with the radially inner ports last, whereby vacuum pockets that may tend to form in radially inner portions of the fluid chambers, due to centrifugal force tending to force fluid therein outward, is prevented from forming by fluid flowing into the fluid chambers from the end of the radially inner port 7, after the fluid chamber has moved out of registry with the radially outer port 8. By arranging the ducts so as to direct fluid to flow unidirectionally with the rotation of the fluid chambers, impact of the fluid at the end of port 7 is made to build up a dynamic pressure therein in accordance with the speed of rotation, and since the duct converges with the cylinder face and its end is shaped to curve radially inward, as shown in Fig. 2, fluid is forced into the fluid chamber under pressure, the separating walls between fluid chambers acting as impeller vanes with respect to the end portions of the ducts. Similarly the separating walls between fluid chambers rotating past the outlet ports 9 and 10 also act as impeller vanes and operate to impell fluid into the diverging outlet duct 6, thus developing a dynamic pressure component therein, in addition to the static pressure component developed by the pistons 37.

When, during rotation, the fluid chambers are about to move out of registry with the inlet ports 7 and 8, the pistons 37 are nearly at the end of their outward stroke and substantially in the position shown in the upper part of Fig. 1. By arranging the fluid chambers in an inclined position, a substantial portion of fluid, that portion above the line 70, is trapped and cannot oppose the flow of fluid into the chamber because of centrifugal force acting thereon. After the chamber has moved out of registry with the port 8 and before it has moved out of registry with port 7, the bulk of the fluid, that portion above the line 71, is trapped leaving only a relatively small space, the space below the line 71, wherein a vacuum pocket may form because of centrifugal force. However, the formation of such pocket is effectively prevented by the impact of fluid at the end of the port 7, tending to impel it into the cylinder under pressure as heretofore described. Provision of the baffle partition, particularly in the inlet port as well as the arrangement of the fluid chambers in an inclined position, thus substantially reducing formation of eddy currents and vacuum pockets and the losses resulting therefrom, permits the use of large and unobstructed fluid chamber openings at the valve face facilitating smooth and rapid flow of fluid into and out of the chambers, and makes it possible to operate the device efficiently at high speed.

With my construction and arrangement I secure wide open fluid chambers and close spacing of the fluid chambers at the valve face suitable for high speed operation and at the same time secure a long stroke of the pistons and great displacement capacity, which with the use of a high fluid pressure as heretofore described provides a device of light weight and high power. The long stroke and other advantages are secured by the use of a relatively large diameter piston actuating element of rugged construction which is subjected to a relatively small angular displacement and by the use of a single universal joint of special construction in which the variation in angular velocity between cylinder element and piston actuating element is moderate and therefore not objectionable because of the relatively small angular displacement between their rotational axes, providing not only a driving connection but also a powerful thrust joint for the transfer of thrust therebetween. From the drawings and particularly from Fig. 5 it will be seen that the piston actuating element 43 is constructed with large sockets, counteracting fluid pressure on the pistons 37, spaced to provide substantial bores housing the roller bearings 50 and crosspin 49 as shown in Fig. 5. It will also be seen that the centers of the ball joints 38 in the piston actuating element 43 are positioned to incline toward the fluid chambers and away from the axis of the crosspin 49 represented by the line E—E in Fig. 1, which is perpendicular to the rotational axis of the piston actuating element 43. This feature reduces the articulation of the pistons 37 within the chambers 32 and the clearance therebetween and also provides a strong support for the outer portion of the bosses 51 extending inwardly from the piston actuating element and serving to transfer thrust to the crosspin 49.

When during operation as a pump the lever 59, in Fig. 1, is moved to the left away from position F, the fulcrum shaft 53 moves upward reducing the angular displacement of its rotational axis and the stroke and displacement of the device, and as the lever 59 reaches position N the fulcrum shaft assumes alignment with the rotor shaft and the stroke and flow of fluid is zero. Thereafter movement of lever 59 toward position R, reverses the pressure in the ports and causes the fluid to flow through the device in the opposite direction.

In the modification shown in Fig. 7, the tension shaft 26 is formed integral with the cylinder element 21 and the thrust element 23 is formed separately and secured to shaft 26 as shown. The fluid chambers 32 in the cylinder element provide smooth bores within which the pistons or rods 37 reciprocate. In this embodiment the ends of the rods 37 are provided with spherical surfaces and articulate with respect to a piston sleeve 72 which provided with an inwardly extending flange engaging the spherical surfaces at the end of the rod 37 whereby the major portion of thrust due to fluid under pressure in the fluid chamber is exerted directly on the ball shaped rod end 73. The construction of the multi-part articulated piston or displacement member, whereby the bulk of the thrust thereon is exerted directly on the rod end, is not claimed herein but forms subject matter and is claimed in my copending application, Serial No. 382,685, filed March 11, 1941, which has matured into Patent No. 2,371,974, bearing date of March 20, 1945. While the cylinder element, in Fig. 7, is of simpler construction, the saving resulting from the use of straight bore cylindrical fluid chambers is offset by the greater complexity of the articulated rod ends. Furthermore, the articulated rod construction is not as strong as the simple one-piece piston 37 in Fig. 1, particularly at the point where the flange on the sleeve 72 engages the ball 73, and therefore is not capable of withstanding the same thrust as the piston 37 shown in Fig. 1. This tends to limit the power capacity of the device.

The modification shown in Fig. 8 differs from the device in Fig. 1, in that thrust balancing is secured by a complete unit 84 having a cylinder element 74, fixedly connected and preferably identical with the cylinder element 21, at least with respect to face area exposed to fluid pressure, in place of the thrust element 23. Both units 84 and 75 are provided with universal thrust joints 76, 77, as in Fig. 1, providing a driving connection between the cylinder element and piston actuating element and their respective fulcrum shafts 78 and 79. The fulcrum shaft 78 provides the power connection 25 and is rotationally supported by the housing of unit 84 in a fixed position, angularly displaced with respect to the rotational axis of the cylinder elements 74 and 21, while the angular position of fulcrum shaft 79 is varied by means of the lever 59. When the device is operated as a variable displacement pump by driving through the power connection 25, the fulcrum shaft 78 drives the cylinder elements 74 and 21 through the joint 76, as well as the fulcrum shaft 79 through the joint 77, and assuming that both units have the same volumetric displacement, and that the fulcrum shafts 78 and 79 are angularly equally displaced corresponding to lever 59 in position F and assuming further that the rotors and shafts rotate in the direction shown by arrow 80, the fluid from both units is discharged through the ports 81, 82 into the duct 83 on the far side of the device, shown in dotted lines and by the arrow. As the lever 59 is moved into position I the shaft 79 aligns with shaft 26 reducing the flow of fluid into duct 83 to one half, since flow out of port 82 has ceased. A further movement of lever 59 into position N reverses the angular displacement of the shaft 79 with respect to shaft 26 causing the unit 75 to operate as a motor while the unit 84 continues to operate as a pump. Assuming that the angular displacement of shaft 79 is the same as, but opposite to that of the shaft 78, fluid out of port 81 flows directly into port 82 of unit 75 so that none flows out of the duct 83. In order to reverse the flow of fluid into and out of the device the lever is moved into position R. The stroke and displacement of unit 75 now exceeds that of unit 84, causing the pressure in the inlet and outlet ducts to reverse. The unit 75 now operates as a pump and the unit 84 as a motor, the fluid represented by the difference in displacement between the units flowing into the duct 83, on the far side, now an inlet duct, and out of a duct on the near side of the device, identical with the duct 83. This modification, while having the advantage of a relatively lesser fluid leakage, because of only a single working clearance between faces per unit, requires substantially twice the number of parts because of the double unit construction and therefore has the objection of higher cost.

From the foregoing it will be seen that my construction and arrangement of the parts of the device permit the use of very high fluid pressures and efficient operation at high speed, thus providing a fluid motor or pump of great power. It should be noted that various changes may be made in the details of construction and combination of the various parts of my device and that one or more of the features disclosed herein may be used in the illustrated or other embodiments without departing from the spirit of my invention, and I desire to cover by my claims such changes and other embodiments which may reasonably be included within the scope of my invention.

I claim as my invention:

1. A rotary fluid pressure engine comprising in combination a stationary housing having a valve body providing a valve face and inlet and outlet fluid ducts terminating in the valve face and forming inlet and outlet fluid ports; a cylinder rotor including a cylinder element having a tension shaft extending axially between said ports and providing a cylinder face arranged adjacent to the valve face forming a working clearance therebetween and subjected to thrust by fluid under pressure in one of said ports and further providing fluid chambers disposed about the rotational axis of the rotor and arranged in an inclined position to diverge outwardly from the cylinder face, the rotor further including a tension yoke extending beyond said fluid chambers from an inner portion of the cylinder element and an outer support extending beyond the fluid chambers from an outer portion of the cylinder element providing an outboard bearing supporting the rotor by the housing; a rotatable piston actuating element arranged between the tension yoke and said outer support adapted to rotate with the rotor providing spherical sockets along its outer periphery and a central bearing adapted to rotationally support the piston actuating element on an axis angularly displaced with respect to the rotational axis of the rotor; reciprocable pistons articulatably associated with said sockets, and arranged within said chambers for transferring thrust exerted by fluid under pressure to said piston actuating element; means associated with the tension yoke of the rotor and with said piston actuating element providing a universal driving connection therebetween and forming a thrust joint transferring axial thrust from the piston actuating element to the rotor; thrust transferring means associated with the tension shaft and with the valve body counteracting axial thrust upon said rotor with fluid under pressure from one of said ports; and means associated with the housing and with said central bearing rotatively supporting the piston actuating element on an axis angularly displaced with respect to the rotational axis of the rotor.

2. In a rotary fluid pressure engine: the combination of a housing having a valve face and inlet and outlet fluid ducts terminating in said valve face forming valve ports; a rotatable cylinder element providing a cylinder face arranged adjacent the valve face having fluid chambers terminating in the cylinder face and having reciprocable pistons therein adapted to be subjected to fluid pressure exerting an outward thrust thereon; a piston actuating element associated with said pistons, said housing rotatively supporting the piston actuating element on an axis angularly displaced with respect to the rotational axis of the cylinder element; and means associated with said cylinder element and housing including articular means associated with said piston actuating element for counteracting said outward thrust on the pistons with fluid under pressure from one of said ducts.

3. In a rotary fluid pressure engine: the combination of a housing having a valve face and inlet and outlet fluid ducts terminating in said valve face forming valve ports; a rotatable cylinder element providing a cylinder face arranged adjacent the valve face adapted to be subjected to fluid pressure exerting a separative thrust between said cylinder element and housing and further providing fluid chambers terminating in said cylinder face and reciprocable pistons in said fluid chambers adapted to be subjected to fluid pressure exerting an outward thrust thereon; a piston actuating element associated with said pistons and associated with said housing rotatively supporting the piston actuating element on an axis angularly displaced with respect to the rotational axis of the cylinder element; means associated with the cylinder element and housing including articular means associated with the piston actuating element for counteracting said separative thrust and said outward thrust on the pistons with fluid under pressure from one of said ducts.

4. In a rotary fluid pressure engine: the combination of a housing having a valve body providing a pair of spaced valve faces arranged to face in opposite directions and pressure fluid ports therein, a port in one valve face communicating with a port in the other valve face forming a pair of pressure ports and further providing a fluid duct communicating with said pair of pressure ports; a pair of rotatable elements arranged one on each side of the valve body, each element having a face forming with a corresponding adjoining valve face a working clearance, fluid pressure in said ports exerting a separative thrust between rotatable elements and betwen said adjoining faces tending to increase the working clearance and fluid leakage therebetween, one of said rotatable elements being shaped to form a rotatable cylinder element providing fluid chambers opening into its face; reciprocable pistons in said fluid chambers subject to fluid pressure exerting a thrust thereon; a piston actuating element operatively connected with said pistons, said housing rotatively supporting the piston actuating element on an axis angularly displaced with respect to the rotational axis of the cylinder element; means associated with the cylinder element and with the piston actuating element providing a driving connection therebetween; and means associated with said pair of rotatable elements for limiting the working clearance and fluid leakage between adjoining faces, said last mentioned means including a tension shaft joining said pair of rotatable elements in axially fixed relation with each other whereby separative thrust exerted by fluid pressure on one rotatable element in one direction is counteracted by separative thrust exerted by fluid pressure on the other rotatable element in the opposite direction.

5. In a rotary fluid pressure engine: the combination of a valve body providing a pair of spaced valve faces arranged to face in opposite directions and pressure fluid ports therein, a port in one valve face communicating with a port in the other valve face forming a pair of pressure ports and further providing a fluid duct communicating with said pair of pressure ports; a pair of rotatable elements arranged one on each side of the valve body, each element having a face forming with a corresponding adjoining valve face a working clearance, fluid pressure in said ports exerting a separative thrust betwen rotatable elements and between said adjoining faces tending to increase the working clearance and fluid leakage therebetween, one of said rotatable elements being shaped to form a rotatable cylinder element providing fluid chambers opening into its face; reciprocable pistons in said chambers subject to fluid pressure exerting a thrust thereon; means for transferring thrust from the pistons to the cylinder element in a direction tending to increase the working clearance between cylinder element and valve body; and means associated with said rotatable elements for limiting the working clearance and fluid leakage between adjoining faces, said last mentioned means including a tension shaft joining said rotatable elements in axially fixed relation with each other whereby separative thrust exerted by fluid pressure on the rotatable cylinder element and its pistons in one direction is counteracted by separative thrust exerted by fluid pressure upon the other rotatable element in the opposite direction.

6. In a rotary fluid pressure engine: the combination of a valve body providing a pair of spaced valve faces arranged to face in opposite directions having fluid ports and further providing inlet and outlet fluid ducts, said ports being arranged and proportioned so that a port in one valve face connects with one of the ducts and communicates with and has substantially the same face area as a port in the other valve face; a rotor element having a face operatively associated with one of the valve faces subject to fluid pressure in one of the ducts exerting a separative thrust on the rotor element in one direction and a second rotor element having a face operatively associated with the other valve face also subject to fluid pressure in the last mentioned duct exerting a separative thrust on the second rotor element in the opposite direction, the rotor elements being joined in axially and circumferentially fixed relation with each other forming a rotor unit, the face of each rotor element being provided with a like number of cavities positioned to be brought into and out of registry with corresponding ports, the cavities in the face of one rotor element being arranged and proportioned to have substantially the same spacing and face area as the cavities in the face of the other rotor element, the cavities being aligned with respect to communicating ports to be brought into and out of registry substantially simultaneously, one of the rotor elements providing displacement chambers, each chamber extending from a corresponding cavity and being provided with a reciprocable piston subject to fluid pressure exerting a thrust thereon; and means including a universal thrust joint transferring said thrust on the pistons to said rotor unit whereby periodic variations in the axial thrust on one of the rotor elements in one direction caused by rotation of the cavities into and out of registry with their respective ports is counteracted and substantially balanced by similar periodic variations in the axial thrust on the other rotor element in the opposite direction.

7. In a fluid pressure engine: the combination of a valve body providing a pair of spaced valve faces arranged to face in opposite directions having fluid ports and further providing inlet and outlet fluid ducts, said ports being arranged and proportioned so that a port in one valve face connects with one of said fluid ducts and communicates with and has substantially the same face area as a port in the other valve face; a rotor element having a face operatively associated with one of the valve faces subject to fluid pressure in one of the ducts exerting a separative thrust on the rotor element in one direction and a second rotor element having a face operatively associated with the other valve face also subject to fluid pressure in the last mentioned duct exerting a separative thrust on the second rotor element in the opposite direction, the rotor elements being joined in axially and circumferentially fixed relations with each other forming a rotor unit, each rotor element being provided with a like number of displacement chambers, each chamber being provided with a reciprocable piston and terminating in chamber openings in the face of a corresponding rotor element positioned to be brought into and out of registry with corresponding ports, the chamber openings in the face of one rotor element being arranged and proportioned to have substantially the same spacing and face area as the chamber openings in the face of the other rotor element, the chamber openings being aligned with respect to communicating ports to be brought into and out of registry substantially simultaneously whereby periodic variations in the axial thrust on one of the rotor elements in one direction caused by rotation of the chamber openings into and out of registry with their respective ports is counteracted and substantially balanced by similar periodic variations in the axial thrust on the other rotor element in the opposite direction.

8. In a rotary fluid engine: the combination of a housing having a valve body providing a pair of spaced valve faces arranged to face in opposite directions and pressure fluid ports therein, a port in one valve face communicating with a port in the other valve face forming a pair of pressure ports and further providing a fluid duct communicating with said pair of pressure ports; a pair of rotatable elements arranged one on each side of the valve body, each element having a face forming with a corresponding adjoining valve face a working clearance, fluid under pressure in said duct exerting a separative thrust between rotatable elements and between said adjoining faces tending to increase the working clearance and fluid leakage therebetween, each of said rotatable elements being shaped to form a rotatable cylinder element providing fluid chambers opening into its face; reciprocable pistons in said fluid chambers subject to fluid pressure exerting an outward thrust thereon; a pair of rotatable piston actuating elements arranged one adjacent each cylinder element and connected with corresponding pistons and associated with said housing rotatively supporting each piston actuating element by the housing on an axis angularly displaced with respect to the rotational axis of a corresponding cylinder element; means associated with said cylinder elements for limiting the working clearance and fluid leakage between adjoining faces; and articular means associated with said piston actuating elements for counteracting the outward thrust exerted by fluid pressure on the pistons in the fluid chambers of one cylinder element by outward thrust exerted by fluid pressure on the pistons in the fluid chambers of the other cylinder element.

9. In a rotary fluid engine: the combination of a housing having a valve body providing a pair of spaced valve faces arranged to face in opposite directions and inlet and outlet fluid ducts terminating in said valve faces forming valve ports; a pair of rotatable elements arranged one on each side of the valve body, each rotatable element having a face forming with a corresponding adjoining valve face a working clearance, fluid under pressure in one of said ducts exerting a separative thrust between said rotatable elements and between said adjoining faces tending to increase the working clearance therebetween, each of said rotatable elements being shaped to form a rotatable cylinder element providing fluid chambers opening into its face, said rotatable elements having means for limiting the working clearance between adjoining faces and joining one with the other in circumferentially fixed relation; reciprocable pistons in the fluid chambers of each cylinder element subject to fluid pressure exerting an outward thrust thereon; a rotatable piston actuating element for each cylinder element, each piston actuating element being associated with the pistons in a corresponding cylinder element and associated with the housing rotatively supporting the piston actuating element by the housing on an axis angularly displaced with respect to the rotational axis of a corresponding cylinder element; and articular means associated with said piston actuating elements for counteracting the outward thrust exerted by fluid pressure on the pistons in the fluid chambers of one of the cylinder elements by outward thrust exerted by fluid pressure on the pistons in the fluid chambers of the other cylinder element.

10. In a rotary fluid pressure engine: the combination of a housing including a valve body and a valve face providing a pair of circumferentially extending fluid ports and inlet and outlet fluid ducts communicating with said ports; a rotor including a cylinder element providing a cylinder face arranged adjacent the valve face and fluid chambers arranged about the rotational axis of said element extending from the cylinder face and provided with reciprocable pistons and further including a tension shaft extending from one side of the cylinder element and a tension yoke extending from the other side of the cylinder element, said pistons and cylinder element being subject to fluid pressure in one of the ports exerting a separative thrust with respect to the valve body, and said rotor providing means for rotatively supporting it by the housing; a rotatable piston actuating element arranged adjacent said tension yoke and provided with a centrally arranged outwardly extending fulcrum shaft and with means for receiving thrust from said pistons; universal driving means including said piston actuating element and said tension yoke forming a thrust joint for transferring thrust from the piston actuating element to said cylinder element; means associated with the fulcrum shaft and housing for rotatively supporting the piston actuating element on an axis angularly displaced with respect to the rotational axis of the rotor; and means associated with said tension shaft and housing for transferring thrust from the rotor to said housing.

11. In a rotary fluid pressure engine: the combination of a housing having a valve body providing a valve face and fluid ports in said valve face, one of said ports being subject to fluid pressure; a rotor having a cylinder element providing a cylinder face arranged adjacent to and adapted to be aligned with the valve face, said rotor being provided with fluid chambers and with reciprocable pistons therein arranged about the rotational axis of the rotor, fluid pressure in one of said ports developing thrust on said cylinder face subjecting the rotor to a biasing force tending to disalign the cylinder face with respect to the valve face, said rotor including an annulus spaced from the cylinder element and provided with a plurality of circularly arranged supporting arms rigidly joining the annulus with an outer portion of the cylinder element at points circumferentially between the fluid chambers and in fixed relation therewith providing spaces between the annulus and said fluid chambers, said rotor further providing a pair of spaced bearings associated with the housing rigidly resisting said biasing force and rotatively supporting the rotor by said housing, one of said bearings being arranged on the fluid chamber side and the other bearing being arranged on the annulus side of said rotor; a rotatable piston actuating element arranged partly within the circle of said supporting arms having a central bearing portion adapted to support it on an axis angularly displaced with respect to the rotational axis of the rotor and having means providing a universal driving connection between the piston actuating element and the rotor and providing ball sockets connecting the piston actuating element with the pistons, said ball sockets being arranged partly within said spaces between the arms; and means extending between the housing and the central bearing portion of said piston actuating element for rotatively supporting the piston actuating element on an axis angularly displaced with respect to the rotational axis of the rotor.

12. In a rotary fluid pressure engine: the combination of a housing having a valve body providing a valve face and fluid ports in said valve face, one of said ports being subject to fluid pressure; a rotor having a cylinder element providing a cylinder face arranged adjacent to and adapted to be aligned with the valve face, said rotor being provided with fluid chambers and with reciprocable pistons therein arranged about the rotational axis of the rotor, fluid pressure in one of said ports developing thrust on said pistons and on the cylinder face subjecting the rotor to a biasing force tending to tilt the cylinder face with respect to the valve face, said rotor including an annulus fixedly associated with an outer portion of said cylinder element; a rotatable piston actuating element having an outer portion arranged to face the fluid chambers and having an axially concentric bearing surface adapted to support the piston actuating element on an axis angularly displaced with respect to the rotational axis of the rotor and providing means operatively connecting it with said pistons for the transfer of thrust therebetween; a universal joint fixedly supported by an inner portion of said cylinder element and associated with the piston actuating element providing a driving connection and transferring thrust between piston actuating element and rotor subjecting the rotor to another biasing force tending further to tilt the cylinder face with respect to the valve face, said rotor providing a pair of spaced bearings associated with the housing rigidly resisting said biasing forces and rotatively supporting the rotor by said housing, one of said bearings being arranged on the fluid chamber side and the other on the annulus side of the rotor thereby effectively limiting the tilt of the cylinder face with respect to the valve face; and means extending between the housing and said axially concentric bearing surface of the piston actuating element angularly displacing the rotational axis of the piston actuating element with respect to the rotational axis of the rotor.

13. In a rotary fluid pressure engine: the combination of a stationary housing providing a valve body having a valve face and inlet and outlet ducts terminating in said valve face to form valve ports; a rotor including a cylinder element providing a cylinder face operatively associated with said valve face and a plurality of inclined fluid chambers disposed about the rotational axis of said cylinder element and arranged to diverge outwardly from the face thereof, one side of said rotor providing a tension shaft extending from the cylinder face through the valve body and the other side providing a tension yoke extending beyond said fluid chambers, said rotor further including means for rotatively supporting it by said housing; reciprocating pistons within said fluid chambers; a rotatable piston actuating element adapted to rotate on an axis angularly displaced with respect to the rotational axis of said rotor providing ball sockets operatively associated with said pistons for transmitting thrust therebetween and provided with means forming with said tension yoke a high capacity single acting universal joint adapted to transfer thrust from the piston actuating element to the rotor providing a driving connection therebetween subject to variations in angular velocity one with respect to the other, the ball sockets in said piston actuating element being positioned to substantially align with the axis of the inclined fluid chambers and so that the center of the ball socket forms with the center of the universal joint an axis inclining substantially toward said fluid chambers and away from the perpendicular to the rotational axis of the piston actuating element whereby a relatively long stroke of the pistons is secured with a moderate angular displacement between the rotational axes of and a moderate variation in the angular velocity between the rotor and the piston actuating element; and means associated with said tension shaft for transferring thrust from the rotor to said housing.

14. In a rotary fluid pressure engine: the combination of a housing including a valve body having a valve face provided with fluid ports arranged about the rotational axis of the engine and providing fluid ducts terminating in said ports; a rotor including a cylinder element providing a cylinder face arranged adjacent to said valve face and including inclined fluid chambers having reciprocable pistons therein arranged about the rotational axis of the rotor, fluid pressure in one of said ports subjecting the pistons and the rotor to axial thrust, said rotor further including a tension shaft extending from one side of the cylinder element through said valve body and a pair of spaced pillars forming a tension yoke extending from the other side of the cylinder element providing a pair of radially extending yoke cavities and anti-friction bearings therein supported by said pillars on an axis perpendicular to the rotational axis of the rotor, one of said pillar cavities extending radially through the pillar; a rotatable piston actuating element arranged about said tension yoke adapted to rotate with the rotor on an axis angularly displaced therefrom providing means along its outer periphery forming with said pistons ball and socket joints operatively connecting them with the piston actuating element and circumferentially between said ball joints providing a pair of diametrically opposite crosspin cavities each provided with an anti friction bearing, supported by the piston actuating element on an axis perpendicular to the rotational axis thereof, one of said crosspin cavities extending through the piston actuating element, and the ball and socket of said joints having a diameter substantially larger than that of said pistons adapted to transfer a powerful thrust to the piston actuating element; and thrust transferring means associated with said rotor and piston actuating element forming therewith a universal joint providing a driving connection therebetween, said thrust transferring means comprising a yoke shaft pivotally supported by the anti friction bearings in said yoke cavities and providing a cross hole extending crosswise therethrough and further comprising a crosspin extending through said cross hole and pivotally supported by the anti-friction bearings in said crosspin cavities, the yoke shaft being adapted to be inserted through the hole in said yoke and the crosspin being adapted to be inserted through the through hole in said piston actuating element facilitating assembly and forming a strong joint for the transfer of a powerful thrust from the piston actuating element to the rotor; and means associated with the tension shaft and with the valve body for transferring thrust from the rotor to the housing.

15. In a fluid pressure engine: the combination of a cylinder element providing cavities forming fluid chambers arranged about the rotational axis of the engine and associated with means conducting fluid into and out of said cavities, said cavities each providing a concavely spherical surface forming a ball socket; reciprocable pistons, one within each chamber and means reciprocating the pistons within said chambers, said displacement members being proportioned to provide a side clearance with respect to said chambers to permit arcuate reciprocation of the displacement members therein; piston receiving bodies slidingly fitted one over each displacement member, each piston receiving body providing a convexly spherical surface forming a ball portion articulatably associated with the ball socket in a corresponding chamber, forming therewith a ball and socket joint, fluid under pressure in such chamber exerting an outward thrust on a minor portion of the piston receiving body, each of said joints being shaped to provide a thrust pocket therein receiving fluid under pressure from its chamber positioned to exert an inward thrust on the piston receiving body counteracting said outward thrust thereon.

16. In a rotary fluid pressure engine: the combination of a housing providing a valve face and inlet and outlet fluid ducts terminating in said valve face to form valve ports; a rotor including a cylinder element providing a cylinder face operatively associated with the valve face and further providing inclined cavities disposed about the rotational axis of the rotor; the cavities at their converging ends forming fluid chambers and being arranged to terminate in the cylinder face in close proximity to each other and near their diverging ends being provided each with a concavely spherical surface forming a ball socket; reciprocable inclined pistons, one within each of said fluid chambers; a rotatable piston actuating element operatively connected with said pistons having means providing a driving connection between it and the rotor and having further means associated with the housing rotatively supporting it on an axis angularly displaced with respect to the rotational axis of the rotor imparting reciprocations to said pistons within the chambers during rotation of the rotor; and piston receiving bodies slidingly fitted one over each piston, each piston receiving body providing a convexly spherical surface forming a ball portion articulately associated with the ball socket in a corresponding chamber forming therewith a ball and socket joint, said piston receiving bodies providing an operatively fluid tight seal between the reciprocating pistons and the cylinder element.

17. In a fluid pressure engine: the combination of a cylinder element providing cavities forming fluid chambers arranged about the rotational axis of the engine and associated with means conducting fluid into and out of the chambers, said chambers being adapted to be subjected to fluid pressure; reciprocable pistons within said chambers subject to fluid pressure therein exerting an outward thrust on said pistons, each piston providing a convexly spherical surface forming a ball portion; and a piston actuating element providing concavely spherical surfaces forming ball sockets, each of said ball sockets being articulately associated with the ball portion of a piston forming therewith a ball and socket joint, each of said joints providing a thrust pocket communicating with and receiving fluid under pressure from a corresponding fluid chamber, said thrust pocket being proportioned and positioned to provide an inward thrust on the pistons counteracting and substantially balancing said outward thrust and providing a substantial outer bearing surface and a substantial central bearing surface within the joint facilitating articulation of the ball within the socket under high pressure conditions.

18. In a rotary fluid pressure engine: the combination of a housing having a valve body providing a pair of valve faces arranged to face in opposite directions and pressure fluid ports therein, a port in one face communicating with a port in the other valve face forming a pair of pressure ports and further providing a fluid duct communicating with said pair of pressure ports; a pair of rotatable elements arranged one on each side of the valve body, a tension shaft extending axially through the valve body joining the rotatable elements in axially fixed relation one with respect to the other, each rotatable element having a face forming with a corresponding adjoining valve face a working clearance, fluid pressure in said ports exerting a separative thrust between rotatable elements and between said adjoining faces tending to tilt the faces of the rotatable elements away from said pressure ports establishing converging fluid films between adjoining faces and subjecting the working clearances adjacent the pressure ports to fluid loss, one of said rotatable elements being shaped to form a cylinder element providing fluid chambers extending from its face having reciprocable pistons therein; and means associated with said rotatable elements and housing limiting the tilt of the faces of the rotatable elements and limiting the fluid loss, said last mentioned means providing a pair of arcuate fluid seals arranged one on each side of the valve body adjacent the outer periphery of adjoining faces, each fluid seal having a radial working clearance between the housing and a corresponding element and forming a circumferential fluid seal with respect to a corresponding pressure port, said last mentioned means further including a pair of outboard bearings one for each rotatable element spaced axially from a corresponding fluid seal rotatively supporting the outer ends of the rotatable elements by the housing whereby said separative thrust exerted by fluid pressure in said ports tends to flex the tension shaft radially in the direction of said pressure fluid ports reducing the radial working clearance of the fluid seals along the periphery of the pressure ports.

19. In a rotary fluid pressure engine: the combination of a valve body having a valve face and circumferentially extending outlet and inlet fluid ports in said valve face; a rotatable cylinder element having a cylinder face operatively associated with the valve face and providing fluid chambers and reciprocable pistons therein arranged about the rotational axis of the cylinder element and terminating in the cylinder face through radially large openings with respect to the fluid chambers for a rapid flow of fluid into and out of the chambers, centrifugal force during rotation tending to oppose the flow of fluid into the chambers and to form vacuum pockets therein; and a circumferentially extending partition associated with said valve body dividing the inlet fluid port into a radially inner port and a radially outer port whereby fluid flowing into the chambers from the radially inner port substantially reduces the formation of vacuum pockets in the chambers during rotation of the cylinder element at relatively high speed.

20. In a rotary fluid pressure engine wherein a valve body having a valve face and a circumferentially extending fluid inlet port therein is associated with a rotor having a rotor face operatively associated with the valve face and provided with fluid displacement chambers arranged about its rotational axis having openings in the rotor face adapted to conduct fluid from said port into the chambers, rotation of said rotor subjecting fluid in said chambers to centrifugal force tending to expel fluid out of the displacement chambers into said port opposing the flow of fluid into the chambers and tending to form vacuum pockets in radially inner portions of said chambers; the combination with said valve body of a circumferentially extending partition in said valve port dividing the port into a radially inner port and a radially outer port whereby fluid flowing into the displacement chambers from the radially inner port substantially reduces the formation of vacuum pockets in the chambers during rotation of the rotor at relatively high speed.

21. In a rotary fluid pressure engine: the combination of a valve body providing a valve face arranged about the rotational axis of the engine and a fluid duct terminating in said valve face to form a circumferentially extending inlet port; a rotatable cylinder element providing a cylinder face operatively associated with the valve face and fluid chambers opening into the cylinder face having reciprocable pistons therein arranged about the rotational axis of the cylinder element adapted to receive fluid from said duct, centrifugal force during rotation tending to expel fluid out of the fluid chamber into said inlet port and tending to form vacuum pockets in radially inner portions of the fluid chambers, said fluid chambers being arranged in an inclined position to diverge from the cylinder face whereby centrifugal force is prevented from expelling a substantial portion of fluid in the diverging portion of the fluid chambers; and a partition arranged circumferentially in said fluid port dividing the fluid port into a radially inner port and a radially outer port whereby fluid flowing into the fluid chambers from the radially inner port substantially reduces the formation of vacuum pockets in the fluid chambers during rotation of the cylinder element at relatively high speed.

ALFONS H. NEULAND.

REFERENCES CITED

The following references are of record in the file of this patent:

UNITED STATES PATENTS

| Number | Name | Date |
|---|---|---|
| 1,263,180 | Williams | Apr. 16, 1918 |
| 1,573,525 | Sandoz | Feb. 16, 1926 |
| 2,284,169 | Robinson | May 26, 1942 |
| 2,290,764 | Neuland | July 21, 1942 |
| 2,292,125 | Ifield | Aug. 4, 1942 |
| 2,298,850 | Vickers | Oct. 13, 1942 |
| 1,392,389 | Anderson | Oct. 4, 1921 |

FOREIGN PATENTS

| Number | Country | Date |
|---|---|---|
| 471,291 | Germany | Feb. 9, 1929 |